United States Patent [19]
Redelman

[11] 3,865,266
[45] Feb. 11, 1975

[54] LOAD CARRIER TRANSFER
[75] Inventor: Paul E. Redelman, South Holland, Ill.
[73] Assignee: Interlake, Inc., Chicago, Ill.
[22] Filed: Feb. 28, 1973
[21] Appl. No.: 336,886

[52] U.S. Cl. .................................. 214/515, 214/85
[51] Int. Cl. ............................................. B60p 1/64
[58] Field of Search ............ 214/85, 85.1, 515, 516, 214/517; 296/1 A; 254/45, 5 C, 2 C, 4 C

[56] References Cited
UNITED STATES PATENTS
2,697,530  12/1954  Claessens............................ 214/516
2,892,656  6/1959  Stuart ................................. 296/1 A Primary Examiner—Albert J. Makay
Attorney, Agent, or Firm—Molinare, Allegretti, Newitt & Witcoff

[57] ABSTRACT

In a storage installation, a load carrier is elevated above the storage installation floor during positioning in a transport position on a transfer vehicle by way of downwardly inclined ramps which gravitationally assist elevation.

7 Claims, 3 Drawing Figures

PATENTED FEB 1 1 1975 3,865,266

3,865,266

LOAD CARRIER TRANSFER

BACKGROUND AND SUMMARY OF THE INVENTION

This invention relates to a multivehicle arrangement and, more particularly, to an improved load carrier and transfer car construction for use in a storage installation.

In mechanized storage and retrieval installations, a load carrier vehicle is frequently provided for operation in one or more aisles between the storage frames of the installation for the handling of articles which are to be stored in and retrieved from the frames. Particularly where the load carrier is a large and rather expensive vehicle, a transfer car or other storage mechanism is also frequently provided for transferring the load carrier between several different aisles for operation alternatively in these aisles. In such load carrier and transfer car installations it is advantageous for several reasons if both the load carrier and transfer can run directly on the floor of the storage installation. Such direct floor running installations eliminate the need for rails in the aisles and across the ends of the aisle, thereby eliminating the personnel hazards associated with such rails, as well as substantially reducing the expense in providing such rails and in the maintenance thereof. In addition, such floor running construction may obviate the need for a pit across the ends of the aisles of the storage installation in which the transfer car operates. Thus, the safety hazards presented by such pits are eliminated. In such floor running pitless installations, however, provision must be made to elevate, in some manner, the load carrier as it is being positioned on the transfer car so that the wheels of the load carrier clear the floor under the transfer car during transfer, this floor being generally coplanar with the floors in the respective aisles in which the load carrier normally operates.

In the multivehicle arrangement constructed in accordance with the present invention, an arrangement is provided to elevate a first vehicle above the plane in which the first vehicle normally operates such that when the first vehicle is positioned upon a second vehicle for transport, the first vehicle clears the floor. In the arrangement incorporating the principles of the invention, not only may the first vehicle be fully positioned under its own power on the second vehicle for transport, but elevation of the first vehicle is gravitationally assisted, such that drive motor sizes, and hence expense, may be substantially reduced. In the arrangement of the present invention, not only is elevation means provided with gravitationally assists in the elevation of a first vehicle as it is being positioned on a second vehicle for transport thereby, but once the first vehicle has been fully positioned for transport, the means by which elevation is assisted also prevents accidental movement of the first vehicle during transport.

In a principal aspect of the present invention, a multivehicle arrangement includes a first vehicle and a second vehicle which is adapted to transport the first vehicle. Fixed inclined support means are positioned on one of the vehicles and movable support means are positioned on the other of the vehicles to engage the fixed inclined support means as the first vehicle is being positioned on the second vehicle for transport, and the fixed inclined support means includes elevation assist means for assisting in the elevation of one end of the first vehicle once the other end of the vehicle has been elevated.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENT

Figure 1:
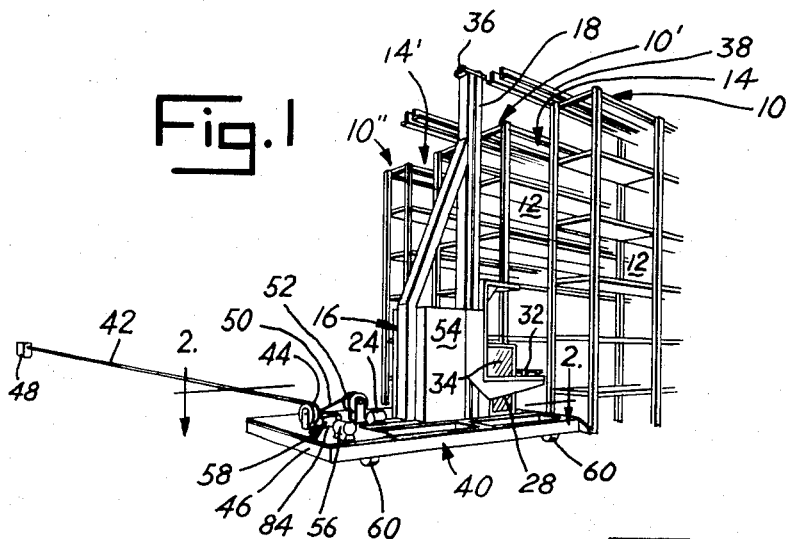
FIG. 1 is a perspective view of a preferred embodiment of article storage and retrieval system incorporating the principles of the present invention.

Referring particularly to FIG. 1, a multivehicle arrangement incorporating the principles of the present invention is shown in which the arrangement is embodied in a storage and retrieval installation of a mechanized storage system. Such storage and retrieval system, in general, includes a plurality of spaced storage frames 10, 10' and 10'' having a plurality of suitable storage bins 12 spaced both vertically and horizontally of each other for receiving and holding the articles which are to be stored in and retrieved from the system. The respective storage frames are spaced from each other so as to define aisles 14 and 14' therebetween in which a suitable load carrier vehicle 16 is adapted to longitudinally move up and down aisles 14 or 14' for the insertion and removal of desired articles into and from the bins. It will be understood that although three storage frames and two aisles are shown, the system may and usually does include more aisles and frames than those shown.

Figure 2:
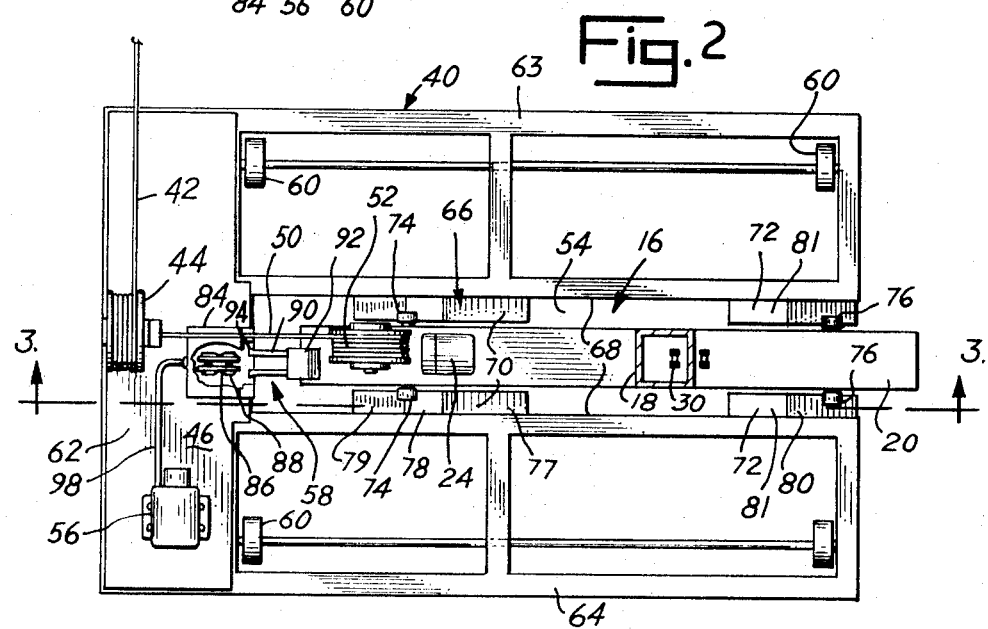
FIG. 2 is a plan view of a preferred embodiment of transfer car and load carrier of the storage and retrieval system of the present invention as viewed substantially along line 2—2 of FIG. 1.
Figure 3:
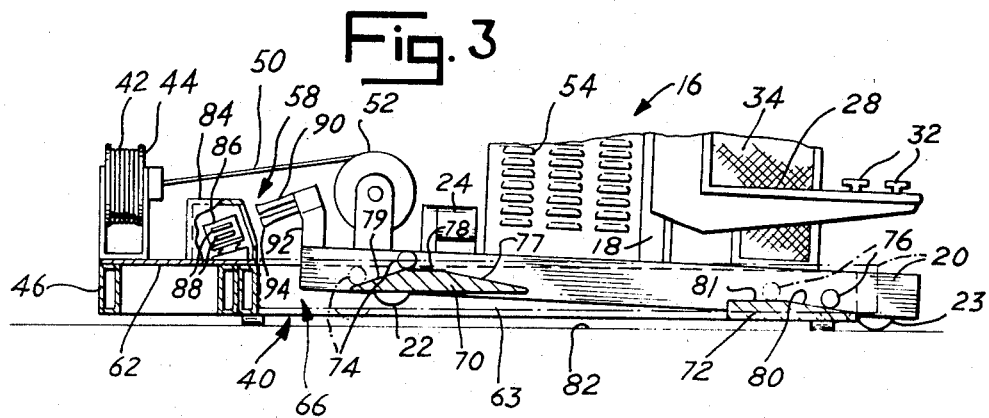
FIG. 3 is a cross-sectioned elevation view of the transfer car and load carrier as viewed substantially along line 3—3 of FIG. 2.

The load carrier 16 preferably includes a vertically extending mast 18 which extends upward from a suitable support bed 20 as shown in FIGS. 2 and 3. The load carrier is adapted to be drivingly supported upon wheels or tires 22 and 23 for movement upon the floors of the aisles 14 or 14'. At least one set of these wheels is preferably powered by a suitable drive motor 24 by way of a drive chain or gear box (not shown).

The load carrier 16 also includes a typical elevatable lift platform 28 which is adapted to move up and down the mast 18 by way of hoist chains 30 as shown in FIG. 2, such that transversely extendible article handling forks 32 or other suitable article handling means may be positioned in elevation adjacent the bin 12 in which it is desired to store or retrieve a given article and the forks 32 may be inserted into the bins. An operator's cage 34 is also mounted on or in association with the lift platform 28 in which an operator may position himself to operate the load carrier.

Suitable guide means is preferably provided for guiding the load carrier 16 for movement in the aisles 14 and 14'. As shown in FIG. 1, such guide means may include, for example, rollers 36 which are positioned adjacent the upper end of the mast 18 of the load carrier and which engage an overhead guide rail 38 to guide the movement of and steady the load carrier in the aisles 14 and 14' of the storage frames during article handling operations.

The storage and retrieval installation of the present invention also includes a floor running transfer car or vehicle 40 which is adapted to move transversely of the aisles 14 and 14' upon the floor of the storage space adjacent the ends of the aisles. Transfer car 40 supportably receives the load carrier 16 thereon as shown in FIG. 3, such that when the load carrier is positioned upon the transfer car for transfer, the transfer car and load carrier may be moved transversely of the aisles 14 and 14' to enable the load carrier to operate in more than one given aisle. If necesssary, a super structure (not shown) may be provided on the transfer car 40 which cooperates with the rollers 36 at the top of mast 18 to steady the load carrier during transfer.

As shown in FIGS. 1-3, a suitable flexible power transmission conductor or cable 42 is carried on a reel 44 mounted at the rear end of the transfer car bed 46. One end of conductor 42 is connected to a suitable source of power 48, preferably electrical, and the reel is rotatable so as to maintain the conductor taut at all times. Another flexible power transmission conductor 50 is carried upon a reel 52 which is also rotatably mounted, but on the bed 20 of the load carrier 16. Power from conductor reel 52 is conducted to the controller housing 54 of the load carrier, from where it is either distributed to the hoist and fork drive motors (not shown) and the load carrier drive motor 24 or, in the alternative, to the transfer car drive motor 56 via a power transmission coupling 58 between the transfer car and the load carrier. In turn, motor 56 is mechanically coupled to the transfer car drive wheels 60, whereby when the motor 56 is energized through coupling 58, the transfer car 40 will be propelled across the ends of the aisles 14 and 14'.

Referring particularly to FIGS. 2 and 3, the transfer car bed 46 is generally U-shaped and comprises a horizontal machinery deck 62 and a pair of spaced support structures 63 and 64 upon which conveyors (not shown) may be supported for feeding articles to and removing articles from the forks 32 of the load carrier lift platform. Thus, the conveyors, if present, may be transported along with the load carrier. The support structures 63 and 64 are spaced from each other so as to define a slotted berth 66 therebetween for receipt of the load carrier 16 for transfer. Attached to the inside of the beams 68 defining the transfer car berth 66 are two pairs of inclined support ramps 70 and 72, the rear pair of ramps 70 being higher in elevation than the front pair of ramps 72. Extending from the opposite sides of the load carrier bed 20 are a plurality of rollers, the pair of rear rollers 74 being elevated above the front rollers 76 and being spaced in the horizontal from each other similarily to the spacing of the inclined support ramps 70 and 72. At least one set of rollers, preferably rollers 74, are powered through suitable gearing or the like (not shown) off the drive shaft which powers wheels 22. As shown in FIG. 3, both of the rear support ramps 70 include an upward inclined surface 77, a flat surface 78, and a downward inclined surface 79, and the front support ramps 72 include an upward inclined surface 80 and a flat surface 81. The spacing of these respective ramp surfaces and the rollers 74 and 76 is such that when the rear rollers 74 are commencing to move down the downward inclined surface 79 of the rear ramps 70, the front rollers 76 are just beginning to ride upward along the upward inclined surface 80 of the front ramps 72 as shown in solid in FIG. 3. Such relationship gravitationally assists in elevating the front end of the load carrier above the floor 82 in a manner which minimizes the power required to perform such elevation, the front end of the load carrier generally being heaviest since it bears the weight of the lift platform 28 and operator's cage 34.

Referring particularly to FIGS. 2 and 3, the coupling 58 couples the load carrier power transmission conductor 50, via the controller housing 54, to the transfer car drive motor 56. The coupling 58 preferably comprises a receptacle housing 84 mounted at the rear of the transfer car berth 66 preferably on machinery deck 62 of the transfer car 40. Inside the housing 84 are positioned a plurality of insulative collector plates 86 having conductive contact shoes 88 mounted thereon. The contact shoes 88 are each adapted to fit into one of the several slotted metal conductor guideways 90 which are mounted by suitable rigid supports 92 so as to extend from the rear of the load carrier for insertion into housing 84 and into contact with shoes 88. The leading end of each of the conductor guideways 90 is preferably flared or horn shaped at 94 so as to assist in the alignment, insertion and mating of the guideways 90 into contact with the contact shoes 88 in the receptacle housing.

Both the contact shoes 88 and the guideways 90 are preferably inclined relative to the horizontal at an angle substantially equal to the angle of the inclination of the downward inclined ramp surface 79, so that as the load carrier begins to move down the incline, smooth insertion of the slotted guideways 90 into mating relationship with the contact shoes 88 will occur. The contact shoes 88, in turn, are electrically connected to the drive motor 56 of the transfer car by a conductor 98 such that when the coupling 58 is made and power is transmitted through the coupling, the drive motor of the transfer car is energized to propel the transfer car.

The electrical control circuitry in controller 54 does not form part of the present invention and, thus, is not shown herein. Suitable control circuitry may readily be selected as desired by one skilled in the art, an example of one such circuit being shown in the pending U.S. application of Raymond H. Richardson, Case No. 72,799, filed on the same date as this application and assigned to the same assignee as the present invention.

The operation of the preferred embodiment of the present invention which has thus far been described is as follows:

Initially it will be assumed that the load carrier 16 has been operating in one of the given aisles 14 and it is now desired to transfer the load carrier to another of the aisles 14' for operation. The transfer car 40 is first positioned at the end of the aisle 14 in which the load carrier is presently located such that the berth 66 of the transfer car is aligned with the aisle 14. The load carrier is operated under its own power by way of motor 24, electrical power being supplied through the conductor 42 on reel 44, the conductor 50 on reel 52, and through the controller 54 to motor 24. Thereby, the wheels 22 and/or 23 of the load carrier drive the load carrier 16 horizontally in the aisle 14 on the floor of the aisle and into the berth 66 of the transfer car 40.

As the load carrier 16 backs into the berth, the rear rollers 74 will pass over the lower inclined support ramp 72 and will continue to move longitudinally into the berth 66 until these rollers 74 come into contact with the upward inclined surface 77 of the support ramp. Since these rollers are also powered off the drive shaft of wheels 22, these rollers 74 will ride up the upward inclined surface 77 of the support ramp 70 and drivingly elevate the rear end of the load carrier upward to lift its drive wheels 22 above the floor as shown in FIG. 3.

Rollers 74 continue to drive the load carrier into the berth 66 by riding up the inclined surface 77 and across the flat 78 of the support ramps 70. When the rollers 74 have reached the end of the flat 78, as shown in solid in FIG. 3, the other front rollers 76 will just come into contact with the upward inclined surface 80 of the front support ramp 72. At this point, elevation of the substantially heavier front end of the load carrier is accomplished by rollers 76 riding up the inclined surface. It will be seen that the power needed to elevate the substantially heavier front end of the load carrier is minimized and elevation of the front end is assisted by way of the downward inclined surface 79 of ramps 70, since the rollers 74 will roll down the inclined surface 79 and thereby gravitationally assist in further backing the load carrier into the berth and drawing the rollers 76 up their inclined surfaces 80. In addition, once the load carrier has been fully positioned on the transfer car for transfer, the rollers 74 will be at the bottom of the downward inclined surfaces 79, as shown in dot and dash in FIG. 3, and thereby accidental movement of the load carrier off the transfer car is prevented during transfer.

When rollers 74 commence their downward travel down the downward inclined surfaces 79, the pickup horns 94 of the conductor guideways will come into contact with the contact shoes 88 in the receptacle 84. Since the shoes 88 and guideways 90 are inclined similarly to the incline 79, insertion of the guideways will be smooth. When the load carrier has been fully positioned in the berth 66 for transfer by the transfer car 40, the drive rollers 74 and 76 will be positioned on the ramps 70 and 72 as shown in dot and dash in FIG. 3 and the guideways will be fully inserted into contact with the contact shoes. Thus, not only is the coupling 58 between the controller of the load carrier made with the transfer car dirve motor 56, but also the primary drive wheels 22 and 23 of the floor running load carrier will be elevated above the floor surface 82.

Once the load carrier has been fully positioned for transfer on the transfer car, the operator, from the operator's cage 34, will cut out the load carrier drive motor 24 and cut in the transfer car drive motor 56 by transferring electrical power from the load carrier through the coupling 58.

Once the berth 66 of the transfer car in which the load carrier is supported has been driven to and aligned with the aisles 14' in which it is now desired to operate the load carrier, the transfer car drive motor 56 is deenergized by the operator without dismounting from the operator cage 34. The operator now energizes the load carrier motor 24 and the rollers 74 will roll up the inclined surface as the rollers 76, assisted by gravity, roll down the inclined surface 80 and when the load carrier wheels 22 and 23 are again positioned on the floor 82, the load carrier will continue to move forward out of the berth and into the aisle 14' in which it is to now operate.

It should be understood that the embodiment of the present invention which has been described is merely illustrative of one of the applications of the principles of the invention. Numerous modifications may be made by those skilled in the art without departing from the true spirit and scope of the invention.

What is claimed is

1. In a multivehicle arrangement including a first vehicle and a second vehicle adapted to transport the first vehicle, comprising fixed inclined support means on one of said vehicles, and movable support means on the other of said vehicles positioned to engage said fixed inclined support means as said first vehicle is being positioned on said second vehicle for transport by the latter, said fixed inclined support means including a pair of support ramps longitudinally spaced from each other, one of said support ramps including a pair of reversely inclined surfaces and the other of said support ramps including at least one inclined surface, and said movable support means including a pair of rollers spaced from each other by a distance such that as one of said rollers moves in a given direction on one of the inclined surfaces of said one of said ramps, the other of said rollers moves in a direction opposite said given direction on the inclined surface of the other of said support ramps to assist said other roller's movement in said opposite direction on said other of said ramps and assist in the elevation of one end of said first vehicle once the other end of said vehicle has been elevated.

2. In the multivehicle arrangement of claim 1 wherein said fixed inclined support means comprises a pair of reversely inclined surfaces and wherein one of said surfaces gravitationally assists in the elevation of one end of the first vehicle once the other end of said first vehicle has been elevated.

3. In the arrangement of claim 1 wherein said pair of support ramps are positioned on said second vehicle and said rollers are positioned on said first vehicle.

4. In the arrangement of claim 3 wherein a first of said pair of support ramps includes upward inclined and downward inclined surfaces and the second of said pair of support ramps incudes an upward inclined surface, and wherein said one of said rollers rides down said downward inclined surface of said first support ramps and said other of said rollers rides up said upward inclined surface of said second support ramp as said first vehicle is being positioned on said second vehicle.

5. In the arrangement of claim 4 including means to power at least one of said rollers, and wherein said first vehicle is an article handling load carrier of a mechanized storage system and said second vehicle is a transfer car for transferring said load carrier between the aisles of the storage system.

6. In the arrangement of claim 3 including means to power at least one of said rollers.

7. In the arrangement of claim 1 wherein said first vehicle is an article handling load carrier of a mechanized storage system and said second vehicle is a transfer car for transferring said load carrier between the aisles of the storage system.

* * * * *